Jan. 4, 1966
C. L. HILDRETH
3,227,545
METALLURGICAL PROCESS
Filed Sept. 26, 1962
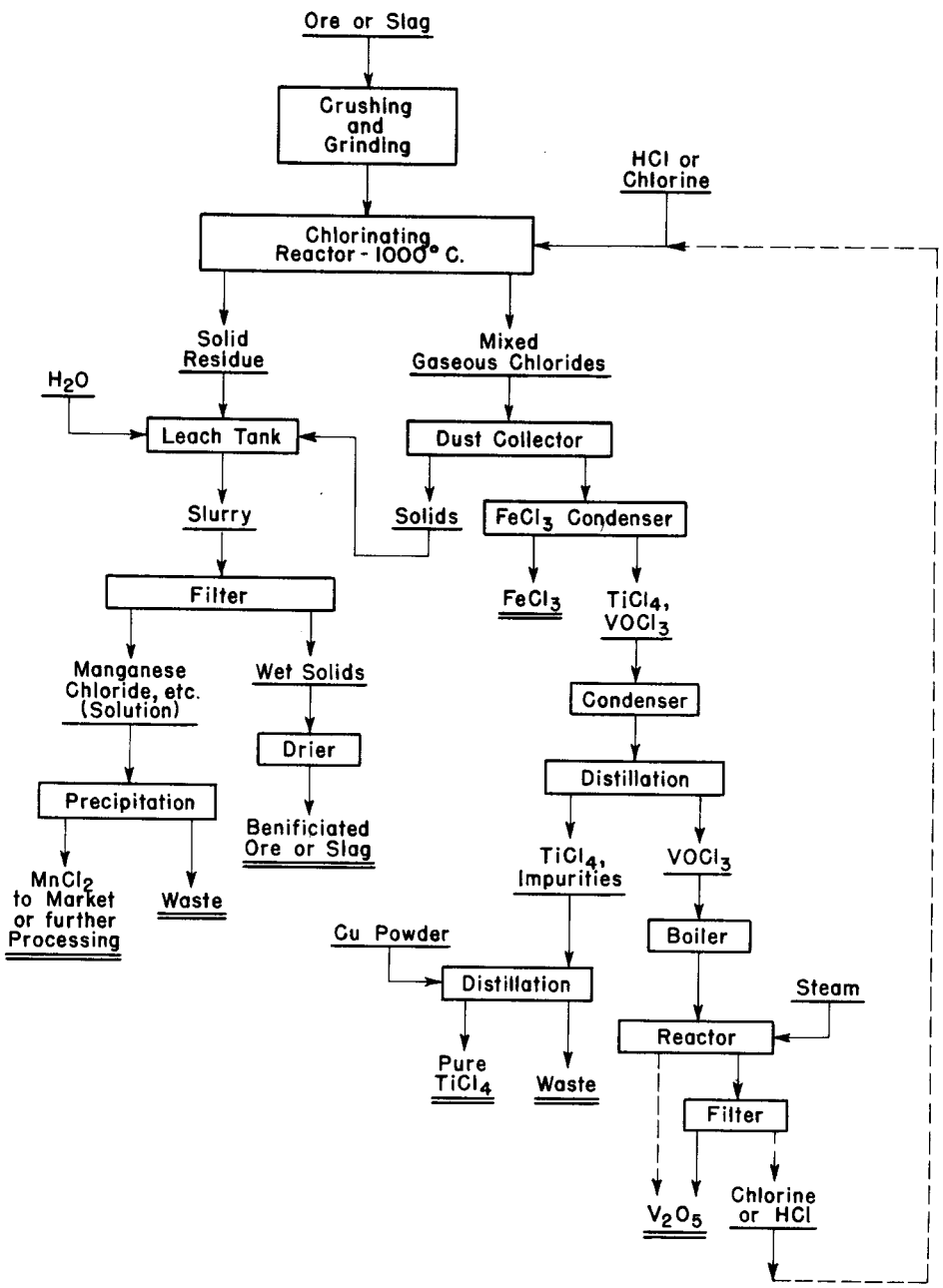
INVENTOR
Clarence L. Hildreth
BY
Charles J. Elderkin
ATTORNEY United States Patent Office 3,227,545
Patented Jan. 4, 1966

3,227,545
METALLURGICAL PROCESS
Clarence L. Hildreth, Williamsville, N.Y., assignor, by mesne assignments, to Independence Foundation, Philadelphia, Pa., a corporation of Delaware, and Koppers Company, Inc., Pittsburgh, Pa., a corporation of Delaware
Filed Sept. 26, 1962, Ser. No. 226,208
9 Claims. (Cl. 75—1)

This invention relates in general to metallurgy, and more particularly to the extraction and recovery of vanadium from ores, slags, and other metal-bearing materials. The process of the invention involves the removal of vanadium from materials of the class described by a unique chlorination treatment wherein the valuable metals and certain deleterious impurities are extracted, the metallic values are recovered in usable form and substantial purity, and the material thus treated is thereby upgraded and made amenable to further processing for other contained elements.

It is an object of this invention to provide a process for the extraction and recovery of metallic values from all types of ores and slags in general, and more particularly from high-titania and high-iron materials such as ilmenites, high-titania magnetites, slags resulting from preliminary iron smelting of these materials, and the like.

Various other objects and advantages will appear from the following description of several embodiments of the invention, and the novel features will be particularly pointed out hereinafter in connection with the appended claims.

In the conventional processes for the extraction of vanadium from ores and slags containing the metal, for example, understanding of the process of the invention will be facilitated by considering, briefly, some of the prior art processes directed toward recovery of the same and similar metals. The general procedure followed is that of an alkaline roasting operation followed by a leaching operation in which the solubilized vanadium salts are removed. Thus, the ore is commonly crushed to —10 to —14 mesh, mixed with from 6 to 10% NaCl and roasted, usually in a multiple hearth roaster and at a temperature of about 850° C. The alkaline roast converts the vanadium oxides to sodium metavanadate (NaVO₃). After leaching, sulfuric acid is commonly added to the wash water so as to adjust the pH to between 1 and 3, which precipitates sodium hexavanadate (NaH₂V₆O₁₇). When dried, this precipitate is sold as commercial-grade vanadium pentoxide, albeit in reality it only contains around 84–94% $V_2O_5$.

Variations of the above-described process have been developed for the treatment of carnotite ores in which it is desired to recover both uranium and vanadium. Generally, a double leach is performed, followed by selective adjustment of pH to precipitate first uranium, and then vanadium. Alternatively, a sodium carbonate leach may be employed.

A further variation is designed for the treatment of iron ores containing less than 1% vanadium and is found in U.S. Patent No. 2,771,341, issued November 20, 1956 to O. F. F. Barth. Briefly, the process involved briquetting or pelleting of the ground ore with sodium carbonate, sintering above 1100° C. and then leaching the soluble sodium vanadate from the sintered pellets. The leaching does not structurally weaken the sintered pellets and they may thereafter be charged directly to a blast furnace.

It can thus be seen that prior art processes are devoid of any indication that chlorination might be effective for the extraction of vanadium values. The use of chlorine in vanadium technology, however, is not entirely unknown. But it is the reduction rather than the extraction of vanadium where chlorination has been proved successful. Thus, typically, a ferrovanadium alloy or a commercial grade pentoxide is used as a starting material and a mixture of vanadium chlorides is produced through chlorination. While many problems are presented by the fact that vanadium forms a large number of chlorides (tetrachloride, trichloride, dichloride and oxytrichloride), each with different properties, the trichloride has been shown amenable to reduction by Kroll type processes as well as other magnesium reduction processes. Some work has also been done on reduction of the tetrachloride with hydrogen.

As is clear from the foregoing, it has never before been considered practical to attempt the chlorination of raw ore or slag for recovery of the vanadium values directly as chlorides.

Briefly, the process of the present invention is based on the fact that either gaseous chlorine or hydrogen chloride will extract vanadium along with lesser amounts of iron, titanium, manganese, calcium, sodium and potassium. With most materials and at normal operating temperatures, however, only the vanadium, titanium and iron chlorides are volatilized completely while the major portion of the remaining chlorides are left in soluble form and can be leached from the residue. It is to be noted that while volatilization of $TiCl_4$ is complete, only a very small amount thereof is formed. It was found that vanadium extraction in excess of 96% could be obtained with either gaseous chlorine or hydrogen chloride under proper conditions. It should be obvious that the foregoing process measures, by themselves, provide a valuable means for upgrading an ore or slag from which it is desired to extract, for example, pigment-grade titania. Vanadium pentoxide, of course, substantially reduces the value of titania due to its color.

For extraction of vanadium with gaseous chlorine, it has been established that the material should be crushed to at least —10 mesh and crushing to —200 mesh is sometimes desirable. On a batch basis it has been found that the extraction was essentially complete after 120 minutes at 1000° C. in the presence of an excess of chlorine, but it should be understood that these conditions will vary with the particular type of reactor used and upon whether the chlorine flows through or over the raw material. As will be obvious to one skilled in the art, the process can be carried on continuously in a fluidized bed reactor or in a cyclone, or series of cyclones fitted out for operation at about 600°–1100° C.

When utilizing gaseous hydrogen chloride in the extraction, it was established that the raw material must be finer than when elemental chlorine is used in order to extract well over 90% of the available vanadium. Other process conditions are about the same as when gaseous chlorine is used, but HCl should be supplied in a considerable excess of the stoichiometric amount required.

It has been further established that the presence of a reductant in the ore or slag is of no benefit in vanadium extraction with either reagent.

In all cases where a titania-containing ore or slag was first treated for the removal of vanadium, it was found that the upgraded material was amenable to titania extraction by conventional procedures.

The gaseous product of the chlorination reaction consists largely of vanadium oxytrichloride ($VOCl_3$), ferric chloride, titanium tetrachloride (when present) and excess free chlorine. While a variety of methods might conceivably be used in the separation and recovery of the various valuable constituents of this gas, a sequence of steps involving condensation of ferric chloride, condensation of the remaining chlorides, fractional distillation to effect separation of $TiCl_4$ and $VOCl_3$, followed by reaction with steam to convert the chloride to the pentoxide, and chlorine recovery, has been found to be both efficient and economical.

As gaseous chlorine is obviously the most efficient reagent for the chlorination reaction, its use is to be preferred. The byproduct recovered from the steam reactor, however, is generally a fairly dilute solution of hydrochloric acid. Operation of the process of my invention, consequently, is materially aided by extraction of free chlorine from this solution. An efficient and economic method of accomplishing this will be found in my copending application Serial Number 289,945, filed June 24, 1963.

It is believed that a better understanding of the invention will be gained by referring to the following detailed description and specific examples thereof, taken in conjunction with the accompanying drawings, and in which, The figure is a flow sheet or flow diagram of an embodiment of the invention directed towards upgrading an ore or slag with the removal of vanadium, iron and a minor portion of titanium.

For purposes of illustration only, the treatment of a high-titania slag from which the major portion of iron has been removed will be described, but it is to be understood that this is in no way to limit the scope of the invention as defined in the claims appended hereto.

With reference to the figure, slag resulting from the selective iron-smelting of an ilmenite is first crushed and ground to 100% minus 200 mesh. It is then fed on a continuous basis to a countercurrent, fluid-bed reactor which is operated at approximately 1000° C. The crushed slag is fed into the top of the reactor, while gaseous chlorine which has been preheated is fed into the bottom. As the chlorination reactions are exothermic, no heat need be added to the reactor after reaction temperature has been reached, provided a sufficient volume of materials is fed into the reactor to make up for heat losses with chemical heat. A screw conveyor takes the solid residue out of the bottom of the reactor and may deliver the solids either to storage or directly to countercurrent leach tanks. A detailed description of solids treatment is set forth hereinbelow.

The gaseous product of the chlorination reactor, consisting of mixed chloride gases and free chlorine, is passed out of the top of the reactor and into a cyclone dust collector which has been suitably constructed for operation at elevated temperatures. Collected solids are mixed with the residue from the chlorination reactor. The clean gases are then piped to a device for separating ferric chloride such as a ferric chloride condenser, which may also be a cyclone which is suitably jacketed, where the temperature of the gases is reduced to below the dew point of ferric chloride, which may be about 275° C., and ferric chloride is condensed and separated.

After leaving the ferric chloride condenser, the vanadium oxytrichloride and titanium tetrachloride are condensed to the liquid state in any suitable manner, and stored. The chlorine, which constitutes almost all of the residual gas, may be recycled to the chlorination step. The collected liquid is next fed into a batch still, where the vanadium oxytrichloride is fractionally distilled. While the boiling points of the two liquids are less than 10 degrees centigrade apart, a partial recycle of distillate and careful operating techniques afford a separation which is above 95%.

The separated $VOCl_3$ is next fed into a boiler where it is vaporized, and it is then reacted with steam so as to convert the oxytrichloride to pentoxide according to the equation $2VOCl_3 + 3H_2O \rightarrow V_2O_5 + 6HCl$. The boiler can be conveniently located in the bottom of the steam reactor. To recover and recycle chlorine from the gaseous products of the steam reactor, the process of my aforementioned copending patent application is to be preferred.

Alternatively, in an installation of sufficient capacity, power can be generated from the excess heat evolved in the exothermic chlorination reactions, and this power can be used to electrolytically recover chlorine and hydrogen from the gaseous HCl produced in the steam reactor. If desired, the hydrogen can be used as a reductant for the vanadium, titanium or manganese products of the process.

The residue from the distillation of $VOCl_3$ consists primarily of titanium tetrachloride and minor impurities. Where a market for pure $TiCl_4$ exists, this product may be purified in a second distillation operation carried out in the presence of one of the known reagents for purification such as copper powder. A pure $TiCl_4$ will result. While there presently exists excess capacity for the production of titanium tetrachloride, it is felt that the very modest expense here involved in purifying an otherwise waste product should enable this product to be sold at highly competitive levels and a credit to be thus obtained.

The solid residue of the chlorination reaction consists of unreacted materials and non-volatile chlorides which are subjected to leaching with water, and filtration of the resultant slurry. The filter cake, substantially free of all chlorides is dried and is then ready for further processing for the recovery of pigment-grade titania. The filtrate is passed to a precipitation tank where the pH is adjusted and manganese chloride and other soluble chlorides are precipitated selectively or together depending on the particular product desired.

As will be obvious to one skilled in the art, the principal products of the invention are an upgraded ore or slag and vanadium pentoxide. The recovery of other products either for sale or recycle within the process, depends both on the composition of the raw material and the capacity of the plant (i.e., the quantity of by-products that can be produced).

It will be noted that while the foregoing explanation has, for purposes of illustration, been confined to treatment of a slag resulting in recovery of vanadium and iron with the upgrading of the slag for subsequent treatment, the process of the invention is applicable to a broad variety of materials.

It is believed that a more detailed understanding of the invention will be gained by referring to the following specific examples which are intended to be illustrative only and not to limit the scope of the invention as set forth in the claims appended hereto.

EXAMPLE I

A high titania iron ore was selected to illustrate the process of the invention. This ore had the following analysis:

*Analysis of ore, percent*

| | |
|---|---|
| $TiO_2$ | 21.02 |
| $Ti_2O_3$ | — |
| $TiO_2$ equivalent | 21.02 |
| Fe | 47.38 |
| $SiO_2$ | 3.56 |
| $Al_2O_3$ | 5.69 |
| CaO | 0.85 |
| MgO | 3.66 |
| $Na_2O$ | N.A. |
| $K_2O$ | N.A. |
| MnO | N.A. |
| $V_2O_5$ | 0.54 |

Preliminarily, the ore was smelted for recovery of the contained iron by utilizing the Strategic-Udy (trademark) selective smelting process. The slag resulting from the smelting program had the following analysis:

*Analysis of slag, percent*

| | |
|---|---|
| $TiO_2$ | 52.7 |
| $Ti_2O_3$ | 5.1 |
| $TiO_2$ equivalent | 58.54 |

| | |
|---|---|
| Fe | 4.70 |
| $SiO_2$ | 8.41 |
| $Al_2O_3$ | 15.73 |
| CaO | 1.43 |
| MgO | 8.10 |
| $Na_2O$ | 0.18 |
| $K_2O$ | 0.20 |
| MnO | 0.93 |
| $V_2O_5$ | 1.48 |

The slag was crushed to 100% minus 200 mesh and reacted with gaseous chlorine at 1000° C. for 120 minutes. The solid residue from the chlorination was leached, dried and analyzed. The analysis was as follows:

*Analysis after selective chlorination and leach*

| | Residue, percent | Extraction, percent |
|---|---|---|
| Fe | 0.29 | 94.53 |
| $TiO_2$ | 63.97 | 2.99 |
| $SiO_2$ | 8.81 | 7.02 |
| CaO | 0.31 | 80.77 |
| $Al_2O_3$ | 17.95 | (−1.28) |
| MgO | 9.08 | 0.51 |
| $V_2O_5$ | 0.05 | 96.80 |
| MnO | 0.19 | 98.57 |
| $Na_2O$ | 0.03 | 83.04 |

It will be noted that the titania content of the beneficiated slag rose from 58½% to about 64%. Similarly, alumina content rose from 15.7 to 17.9%. At the same time, $V_2O_5$ dropped from 1.48 to 0.05 and iron from 4.7 to 0.29. As is obvious, such a material, being low in iron and vanadium is ideal for the recovery of pigment-grade titania. It has also been found that this product may be economically treated for the recovery of aluminum sulfate via the technique described in copending application of Marvin J. Udy, Serial No. 125,620, filed June 15, 1961.

Extraction of vanadium in this instance amounted to +96% and was recovered as pure vanadium pentoxide in the manner described heretofore. As the extraction was carried out on a modest scale and on a batch basis, no attempt was made to recover other by products.

The procedures of Example I were repeated on five different slags, and the results thereof are summarized below.

EXAMPLE II

| Component | Charge, Percent | Residue, Percent | Extraction, Percent |
|---|---|---|---|
| $TiO_2$ | 1.44 | 0.49 | 81.28 |
| V | 0.052 | 0.0016 | 98.58 |
| CaO | 24.32 | 7.88 | 82.17 |
| MgO | 3.37 | 2.63 | 57.05 |
| $Na_2O$ | 0.07 | 0.015 | 88.42 |
| $K_2O$ | 0.08 | 0.012 | 91.71 |
| Mn | 1.03 | 0.02 | 99.89 |
| Cr | 3.51 | 2.00 | 68.50 |
| Total | 100.00 | 100.00 | 44.38 |

EXAMPLE III

| Component | Charge, Percent | Residue, Percent | Extraction, Percent |
|---|---|---|---|
| $TiO_2$ | 9.38 | 7.18 | 47.19 |
| V | 1.91 | 0.010 | 99.63 |
| CaO | 8.73 | 1.07 | 91.54 |
| MgO | 15.71 | 14.75 | 35.22 |
| $Na_2O$ | 0.15 | 0.012 | 94.36 |
| $K_2O$ | 0.23 | 0.01 | 96.96 |
| Mn | 0.71 | 0.13 | 87.36 |
| Cr | 0.057 | 0.007 | 91.61 |
| Total | 100.00 | 100.00 | 31.01 |

EXAMPLE IV

| Component | Charge, Percent | Residue, Percent | Extraction, Percent |
|---|---|---|---|
| $TiO_2$ | 71.2 | 84.4 | 14.61 |
| V | 0.28 | 0.003 | 99.18 |
| CaO | 0.37 | 0.01 | 98.03 |
| MgO | 4.70 | 1.26 | 80.69 |
| $Na_2O$ | 0.20 | 0.01 | 96.36 |
| $K_2O$ | 0.15 | 0.01 | 95.14 |
| Mn | 0.21 | 0.01 | 96.53 |
| Cr | 0.094 | 0.02 | 84.49 |
| Fe | 11.0 | 0.098 | 99.36 |
| Total | 100.00 | 100.00 | 27.96 |

EXAMPLE V

| Component | Charge, Percent | Residue, Percent | Extraction, Percent |
|---|---|---|---|
| $TiO_2$ | 87.92 | 94.47 | 4.21 |
| V | 0.022 | 0.0005 | 80.77 |
| CaO | 0.05 | 0.01 | 82.05 |
| MgO | 0.73 | 0.07 | 91.42 |
| $Na_2O$ | 0.20 | 0.007 | 96.81 |
| $K_2O$ | 0.17 | 0.01 | 94.74 |
| Mn | 4.12 | 0.95 | 79.44 |
| Cr | 0.014 | 0.006 | 60.61 |
| Fe | 2.48 | 0.035 | 98.75 |
| Total | 100.00 | 100.00 | 10.86 |

EXAMPLE VI

| Component | Charge, Percent | Residue, Percent | Extraction, Percent |
|---|---|---|---|
| $TiO_2$ | 0.37 | .020 | 76.91 |
| V | 0.80 | 0.0026 | 99.90 |
| CaO | 21.42 | 0.91 | 98.18 |
| MgO | 1.23 | .046 | 83.95 |
| $Na_2O$ | 0.81 | 0.150 | 92.07 |
| $K_2O$ | 0.49 | 0.015 | 98.72 |
| Mn | 0.13 | 0.013 | 95.78 |
| Cr | 0.03 | 0.007 | 89.47 |
| Total | 100.00 | 100.00 | 57.11 |

The results of Examples I through VI may be summarized as follows:

Titanium: Only a small amount of the titanium is extracted from high titania slags. The extraction is high, however, when the slag contains small amounts of titania. Of course, the latter slags would not be used for titania recovery.

Vanadium: The extractions were all over 95 percent except for one which had such a low vanadium content before treatment that analytical accuracy was difficult.

Calcium: In every case, over 80 percent of the calcium was extracted.

Magnesium: Magnesium behaved similarly to titanium in showning high extraction at low mangesia content and low extraction at high content.

Sodium: All extractions were over 80%.

Potassium: All extractions were over 90%.

Manganese: Manganese behaved as did titanium and magnesium, but the highest manganese content in the untreated slag was about 4% and almost 80% of this was extracted.

Chromium: Chromium extraction also decreased with increasing chromium content of the slag. The highest chromium content was 3% and the extraction was 68.5%.

Iron: In every case in which iron extraction was determined, it was over 90%.

Aluminum: Alumina is apparently unattacked.

Silicon: There is little attack on silica.

While Examples II through VI were conducted using the same procedures as outlined in Example I, it should be noted that satisfactory extractions can be achieved with coarser material at the same temperatures, provided the extraction time is increased. It should be emphasized that degree of comminution and reaction time will vary inversely as between themselves and absolutely with the efficiency of the reactor employed.

Example VII

In order to determine the rate of vanadium removal at lower temperatures, a sample of the slag used in Example I was crushed to minus 20 mesh and split into four fractions. All four portions were chlorinated for 1½ hours at 400° C. Three of them were then chlorinated for an additional 1½ hours at 550° C. Two of the last three were chlorinated for an additional 1½ hours at 700° C. One of the last two was chlorinated for 2½ hours at 1000° C. The solid residue was leached, dried and analyzed for vanadium. The analyses were as follows:

*Analysis after selective chlorination and leach*

| Chlorination treatment | Vanadium in residue, percent | Vanadium extraction, percent |
| --- | --- | --- |
| 1½ hours, 400° C | 0.79 | 4.6 |
| 1½ hours, 400° C. plus 1½ hours, 550° C | 0.76 | 9.1 |
| 1½ hours, 400° C. plus 1½ hours, 550° C. plus 1½ hours, 700° C | 0.155 | 82.1 |
| 1½ hours, 400° C. plus 1½ hours, 550° C. plus 1½ hours, 700° C. plus 2½ hours, 1000° C | 0.069 | 93.0 |

It will be understood that various changes in the details, materials, steps and arrangements of parts, which have been herein described and illustrated in order to explain the nature of the invention, may be made by those skilled in the art within the principle and scope of the invention as expressed in the appended claims.

Having thus described the subject matter of the invention, what it is desired to secure by Letters Patent is:

1. Process for the removal and recovery of vanadium values from vanadium-bearing ores, slags and like materials comprising the steps of
    reacting a finely divided quantity of said material with a free-chlorine containing gas at a temperature of approximately 1000° C. to effect production of a mixture of gaseous chlorides containing said vanadium and a solid residue;
    separating said residue and said gaseous mixture;
    cooling said gaseous mixture so as to condense any contained iron therefrom as ferric chloride;
    condensing said gaseous mixture to the liquid state;
    distilling said liquid to effect separation of said vanadium values from remaining impurities; and
    recovering said vanadium from said distillation operation, primarily as the oxytrichloride.

2. Process according to claim 1, wherein said vanadium oxytrichloride is further treated by reacting with steam, effecting thereby the production and recovery of vanadium pentoxide and gaseous hydrogen chloride.

3. Process according to claim 1, wherein said solid residue is further treated by leaching and filtering, effecting thereby the solubilization of chlorides contained therein and recovering a substantially vanadium- and iron-free residue.

4. Process according to claim 1, wherein said free-chlorine containing gas is selected from the group consisting of chlorine and hydrogen chloride, and said gas is present in a stoichiometric excess.

5. In the extraction of vanadium from vanadium-bearing ores, slags and like materials, the improvements that comprises
    reacting a finely divided quantity of said material with a free-chlorine containing gas at a temperature of approximately 1000° C. to effect production of a mixture of gaseous chlorides containing said vanadium and a solid residue; and
    recovering the vanadium from said mixture.

6. Process for the treatment of ores, slags and like materials containing a substantial portion of titania and minor portions of iron and vanadium comprising
    reacting a finely divided quantity of said material with a free-chlorine containing gas at a temperature of approximately 1000° C. to effect production of a mixture of gaseous chlorides containing substantially all of said iron and vanadium values and a minor portion of said titania values, and a solid residue;
    separating said residue and said gaseous chlorides;
    cooling said gaseous mixture so as to condense ferric chloride therefrom;
    condensing said gaseous mixture to the liquid state;
    distilling the resulting liquid and recovering said titania and vanadium values as separate fractions;
    leaching and filtering said solids residue so as to remove therefrom soluble chlorides; and
    treating the resulting chloride-, iron- and vanadium-free residue for recovery of titania.

7. Process according to claim 6, wherein said vanadium values are further treated by reacting with steam, whereby vanadium pentoxide and hydrogen chloride are produced and recovered.

8. Process according to claim 7, wherein said hydrogen chloride is recycled to the chlorinating step.

9. Process according to claim 7, wherein said hydrogen chloride is treated for the recovery of substantially pure chlorine, and said chlorine is recycled to the chlorinating step.

References Cited by the Examiner

UNITED STATES PATENTS

| | | | |
| --- | --- | --- | --- |
| 1,671,003 | 5/1928 | Bagsar | 75—113 |
| 1,923,094 | 8/1933 | Jenness | 75—112 |
| 2,030,867 | 2/1936 | Hart | 75—1 |
| 2,030,868 | 2/1936 | Hart | 75—112 |
| 2,184,884 | 12/1939 | Muskat et al. | 75—1 |
| 2,291,206 | 7/1942 | Bowes | 75—1 |
| 2,797,155 | 6/1957 | Vaughan | 75—1 |
| 2,843,472 | 7/1958 | Eberhardt | 75—1 |
| 2,905,545 | 9/1959 | Cookston | 75—1 |
| 2,993,759 | 7/1961 | Schreiner et al. | 75—1 |

FOREIGN PATENTS

| | | |
| --- | --- | --- |
| 682,020 | 11/1952 | Great Britain. |
| 744,415 | 2/1956 | Great Britain. |

BENJAMIN HENKIN, *Primary Examiner.*